US008454790B2

(12) United States Patent
Burton et al.

(10) Patent No.: US 8,454,790 B2
(45) Date of Patent: Jun. 4, 2013

(54) METHOD OF MANUFACTURING A HARD WOOD STRAND PRODUCT

(75) Inventors: Peter Edward Burton, Keppel Sands (AU); Graham Thomas Coulthard, Berwick (AU)

(73) Assignee: Lignor Limited, Keppel Sands, Queensland (AU)

( * ) Notice: Subject to any disclaimer, the term of this patent is extended or adjusted under 35 U.S.C. 154(b) by 289 days.

(21) Appl. No.: 12/775,685

(22) Filed: May 7, 2010

(65) Prior Publication Data

US 2010/0266807 A1 Oct. 21, 2010

Related U.S. Application Data

(63) Continuation of application No. 10/597,259, filed as application No. PCT/AU2004/001756 on Dec. 15, 2004, now Pat. No. 7,740,929.

(30) Foreign Application Priority Data

Jan. 27, 2004 (AU) ................................ 2004900364

(51) Int. Cl.
*B32B 5/00* (2006.01)
*B32B 7/00* (2006.01)
*E04C 1/00* (2006.01)

(52) U.S. Cl.
USPC ........... 156/296; 52/309.1; 156/60; 156/62.6; 428/98; 428/114; 428/221; 428/298.1; 428/299.1; 428/332

(58) Field of Classification Search
USPC ............. 52/309.1; 428/98, 221, 298.1, 299.1, 428/332; 156/60, 62.6, 296
See application file for complete search history.

(56) References Cited

U.S. PATENT DOCUMENTS 4,361,612 A * 11/1982 Shaner et al. ................. 428/106
5,525,394 A * 6/1996 Clarke et al. .................. 428/105
6,129,871 A * 10/2000 Suzuki et al. ................... 264/51
2003/0064230 A1* 4/2003 Liu et al. .................... 428/425.1

FOREIGN PATENT DOCUMENTS

JP 9-169012 6/1997

* cited by examiner

*Primary Examiner* — Brent Ohern
(74) *Attorney, Agent, or Firm* — Ladas & Parry LLP

(57) ABSTRACT

A method of manufacturing a hard wood strand product, comprising the steps of harvesting logs of eucalypts from plantation trees having an age between 8 years and 12 years, forming strands from the logs, adding a binder including a polymeric methane di-isocyanate resin and a wax to the strands, forming a mat with the strands, and pressing and heating the mat using a press to form the strand product.

17 Claims, 1 Drawing Sheet

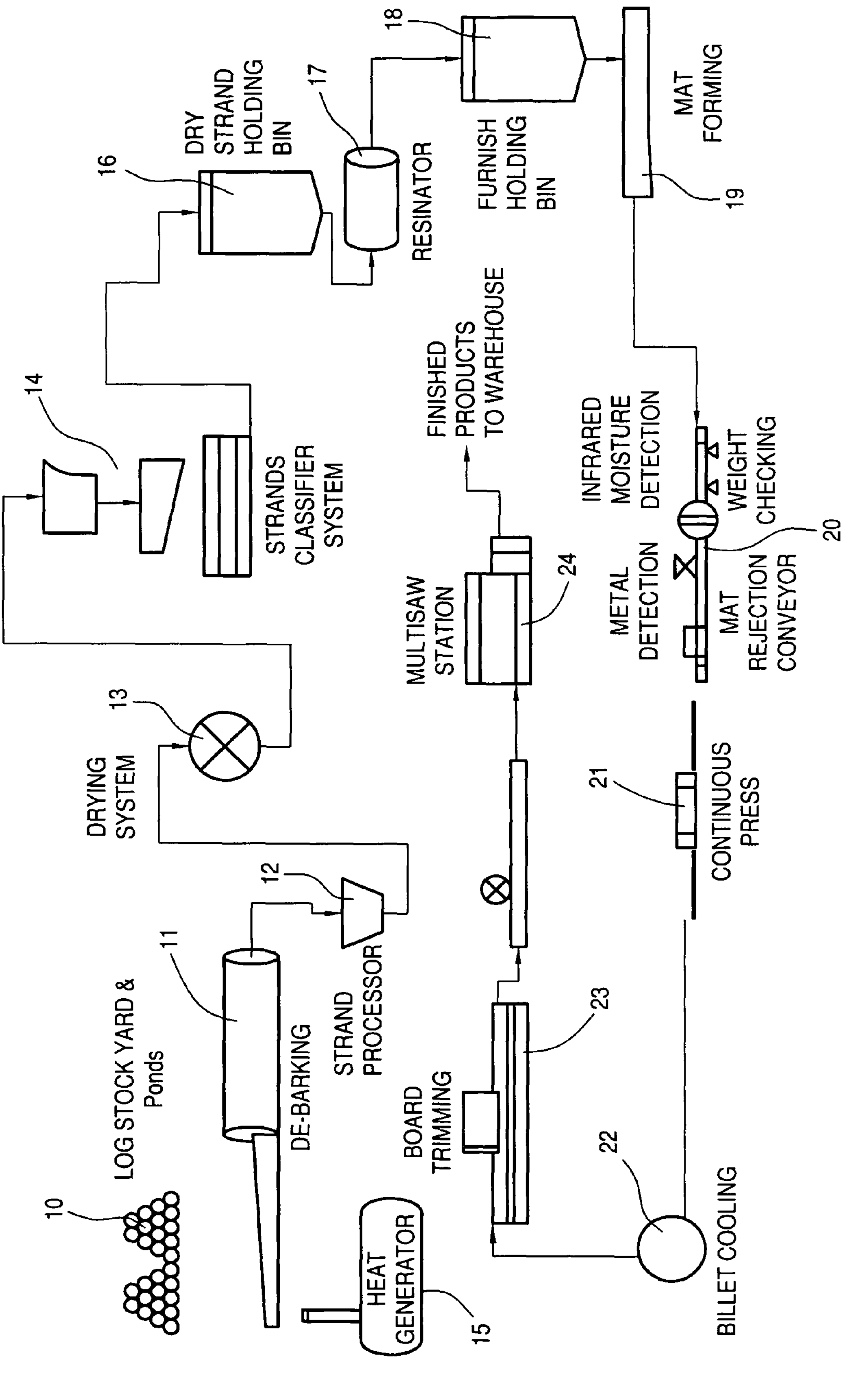

LOG STOCK YARD & Ponds
10
DE-BARKING
11
STRAND PROCESSOR
12
DRYING SYSTEM
13
14
STRANDS CLASSIFIER SYSTEM
DRY STRAND HOLDING BIN
16
RESINATOR
17
FURNISH HOLDING BIN
18
MAT FORMING
19
INFRARED MOISTURE DETECTION
WEIGHT CHECKING
20
METAL DETECTION
MAT REJECTION CONVEYOR
CONTINUOUS PRESS
21
BILLET COOLING
22
BOARD TRIMMING
23
MULTISAW STATION
24
FINISHED PRODUCTS TO WAREHOUSE
HEAT GENERATOR
15

METHOD OF MANUFACTURING A HARD WOOD STRAND PRODUCT

This application is a continuation of Ser. No. 10/597,259, filed Sep. 5, 2006, incorporated herein by reference, which is a filing under 35 USC 371 of PCT/AU2004/001756, filed Dec. 15, 2004.

BACKGROUND OF THE INVENTION

This invention relates to hardwood products and particularly but not only to strand lumber and board products formed from eucalypts.

A number of man made timber products are known including particle board (PB), medium density fibreboard (MDF), plywood, laminated veneer lumber (LVL) and oriented strand board (OSB).

Particle board lacks sufficient strength for most structural uses. Plywoods require veneer sheets from relatively high grade logs. MDF products have a number of uses but generally lack structural strength and moisture resistance. OSB and LVL products have a broad range of uses but also suffer from a relatively low resistance to moisture. Their structural strength and holding capacity for fastenings is also directional.

LVL is an adaptation of old technology from the plywood industry and is similarly reliant on old or larger diameter trees, typically 40 years old or more, and around 500 mm in diameter. This provides a relatively low conversion rate from log to LVL product.

Laminated strand lumber (LSL) is another man made timber product but is based on softwoods such as aspen and yellow poplar. These species grow relatively rapidly and this product has also found commercial use as a construction lumber.

SUMMARY OF THE INVENTION

It is an object of the present invention to provide an improved strand lumber or board product formed from one or more hardwoods or at least to provide an alternative to existing products.

In one aspect the invention may be said to reside in a strand lumber or board product including substantially aligned strands of one or more eucalypts species bonded together with a binder including an isocyanate or phenolic resin.

In a preferred embodiment the eucalypt species are Bluegum (*E. Globulus*), Karri (*E. Diversicolor*), Sydney Bluegum (*E. Saligna*), Marri (*E. Calophylla*) or Jarrah (*E. Marginata*), and the binder includes a polymeric methane di-isocyanate (PMDI) resin. The binder preferably also includes a wax such as a paraffin emulsion.

Preferably the strands have an average length of between 145 mm and 180 mm, an average width of about 10 to 25 mm, and an average thickness of between 0.5 mm and 1.5 mm. Preferably at least 70% of the strands are fully aligned.

DESCRIPTION OF FIGURE

Preferred embodiments of the invention will be described with reference to the accompanying drawing which schematically shows a method of forming a strand lumber product.

DETAILED DESCRIPTION OF THE PREFERRED EMBODIMENTS

Referring to the drawing it will be appreciated that the invention can be implemented in a variety of different products for a range of purposes. The process outlined here is based on the Siempelkamp ContiRoll™ system and is given by way of example only. Other processes for manufacturing strand lumber or board products may also be suitable.

As shown in the drawing, the process begins with harvested logs of the genus eucalyptus and perhaps other similar hard wood logs 10. The preferred eucalypt species are Bluegum (*E. Globulus*), Karri (*E. Diversicolor*), Sydney Bluegum (*E. Saligna*), Marri (*E. Calophylla*) or Jarrah (*E. Marginata*). In the case of plantation trees such as Bluegum (*E. Globulus*) and Sydney Bluegum (*E. Saligna*) the trees are preferably around 8 to 12 years old and have a diameter of around 150 to 200 mm. In the case of forest thinnings such as Karri (*E. Diversicolor*), Mani (*E. Calophylla*) or Jarrah (*E. Marginata*) the trees are preferably less than 30 years old and less than 400 mm diameter. Single species may be used in a particular product or multiple species may be combined.

The logs are debarked 11 before passing through a strander 12. A ring strander is typically used to cut logs of fixed or random length into strands of a specified length, width and thickness. The strands are preferably formed with a length of about 145 mm to 180 mm, a width of about 10 to 25 mm and a thickness of about 0.5 to 1.5 mm.

The strands are dried 13 to preferably less than 5% moisture and are then classified in sieves 14 according to product specifications. A bin 16 holds the dried and classified strands until required.

Waste bark or rejected strands and fines provide the fuel for a heat plant 15 that generates heat for the drier and other parts of the process. About 70% of the original logs can be used to form product. Most of the remaining 30% can be used in the heat plant.

From bin 16 the strands are conveyed on demand to a resin blender 17 in which resin and wax are added in required proportions, typically about 6 to 10% of dry matter and 2% of dry matter respectively. The mixed strand resin and wax is known as "furnish" and is held in a holding bin 18.

The preferred resin is an isocyanate binder such as polymeric methane di-isocyanate (PMDI). Phenolic or other resins might also be used but generally have less favourable properties. The preferred wax is a paraffin emulsion such as Mobilcer™ available from Mobile Australia, or similar products available from Dynea and Oest. Other additives such as pesticides, fungicides and fire retardants can be added at this point and mixed to ensure uniform distribution throughout the finished product matrix.

From bin 18, the furnish is supplied to a mat former 19 where the strands are aligned and deposited to form a mat of the required mass. A combination of alignment and mass controls the mechanical properties of the mat produced. The strands are formed in substantially aligned or unidirectional arrangement. Typically at least 70% of the strands are aligned. Some board products may require a central layer with strands aligned perpendicular to top and/or bottom layers.

The mat then passes a checking station 20 which carries out weight, moisture and metal detection. Any rejected material is conveyed either as waste to the heat plant or set aside for special processing.

Mats which pass the checking station are passed through a preheating station prior to the continuous press 21 to form billets or boards, typically around 30 to 90 mm in thickness for billets and around 8 to 30 mm thickness for boards, all up to 2.7 m wide and 15 m long. The press heats the material to above 100° C. for at least 1 minute. The billets are cooled 22 and trimmed 23 and/or sawn 24 into construction timber products.

A product formed from eucalypts using a process of this kind can be manufactured with full structural rating, and free of knots, bow, twist and wane. The density profile of the material is also substantially uniform. It may in the case of the board product be suitable for uses such as flooring, concrete formwork, decking material and in the case of lumber for structural wood products such as beams and columns, headers and lintels, joists and rafters, walls, studs and plates, and joinery products for example.

The product has been demonstrated to provide a number of advantages over most other softwood and hardwood products. It exhibits a high surface soundness, moisture resistance and shows a low swell rate in the presence of moisture. Additionally, the screw and nail holding performance is high in all planes.

Test products using Bluegum (*E. Globulus*) logs and Karri (*E. Diversicolor*), thinnings had the following characteristics:

1. Modulus of elasticity of around 14,000 N/mm$^2$ for Bluegum and 20,000 N/mm$^2$ for Karri.
2. Swell of less than 2% in a standard 24 hour moisture swell test for both products.
3. An internal bond strength of 1.21 N/mm$^2$.
4. High screw and nailing performance in all planes.
5. Uniform density profile.
6. A surface soundness of 2.42 N/mm$^2$.

These characteristics, particularly the modulus of elasticity are substantially better than those of alternative products, such as Radiata glulam, Douglas fir glulam, Hyspan LVL and MGP12 Pine, for which the moduli are around 12,500 N/mm$^2$, 13,500 N/mm$^2$, 13,500 N/mm$^2$ and 12,700 N/mm$^2$ respectively, for example.

The foregoing describes only a limited number of product embodiments and modifications can be made without departing from the scope of the invention.

The invention claimed is:

1. A method of manufacturing a hard wood strand product, comprising the steps of:

a) harvesting logs of eucalypts from plantation trees having an age between 8 years and 12 years;

b) forming strands from the logs;

c) adding a binder including a polymeric methane di-isocyanate resin and a wax to the strands;

d) forming a mat with the strands; and, e) pressing and heating the mat using a press to form the strand product.

2. A method according to claim 1 wherein the plantation trees are a Eucalyptus species selected from the group consisting of Bluegum (*Eucalyptus globulus*) and Sydney Bluegum (*Eucalyptus saligna*).

3. A method according to claim 1 wherein the strands are formed having an average length between 145 mm and 180 mm.

4. A method according to claim 1 wherein the strands are formed having an average width of about 10 to 25 mm.

5. A method according to claim 1 wherein the strands are formed having an average thickness between 0.5 mm and 1.5 mm.

6. A method according to claim 1, additionally comprising substantially aligning the strands.

7. A method according to claim 6 wherein at least 70% of the strands are fully aligned.

8. A method according to claim 1 wherein the strand product is formed having a density of between 600 kg/m$^3$ to 850 kg/m$^3$.

9. A method according to claim 1 wherein the strand product is formed as a lumber or board product.

10. A method according to claim 1 wherein the strand product is formed having a modulus of elasticity $\geqq$14,000 N/mm$^2$.

11. A method according to claim 1 wherein the logs are harvested from plantation trees having a diameter between 150 mm and 200 mm.

12. A method according to claim 1, additionally comprising debarking the logs and passing the logs through a strander to form the strands.

13. A method according to claim 1, additionally comprising drying the strands to less than 5% moisture.

14. A method according to claim 1, additionally comprising forming the mat with a plurality of layers, each layer having substantially aligned strands.

15. A method according to claim 14, additionally comprising forming the mat including at least a top layer, a central layer and a bottom layer, each said layer having substantially aligned strands within a respective layer, wherein the substantially aligned strands of the central layer are oriented perpendicularly to the substantially aligned strands of at least one of the top layer and the bottom layer.

16. A method according to claim 14, additionally comprising forming the mat including a top layer and a bottom layer each having strands substantially aligned in a first direction, and a central layer having strands substantially aligned in a second direction substantially perpendicular to the first direction.

17. A method according to claim 1 wherein the strand product is formed having an internal bond strength of $\geqq$1.21 N/mm$^2$.

* * * * *